Dec. 8, 1964  A. C. MULDER  3,160,783
ARC WELDER WITH A THERMAL CONTROL
Filed March 16, 1961
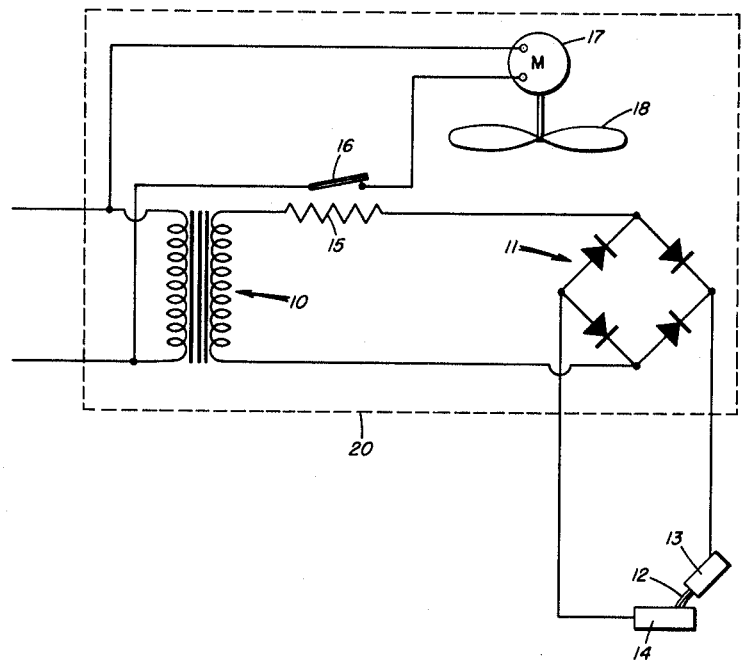
ALLEN C. MULDER
INVENTOR
BY *Sughrue Rothwell Mion & Zinn*
ATTORNEYS “United States Patent Office”

3,160,783
Patented Dec. 8, 1964

3,160,783
ARC WELDER WITH A THERMAL CONTROL
Allen C. Mulder, Appleton, Wis., assignor to Miller
Electric Mfg. Co., Appleton, Wis.
Filed Mar. 16, 1961, Ser. No. 96,166
6 Claims. (Cl. 315—117)

This invention relates to improvements in arc welders and more particularly to an arrangement for automatically air cooling the welder to dissipate the internal heat generated by either the welding current or other external means.

One rather common way to control the temperature of a welding machine is to transfer heat generated by the welding circuit to an air stream. Welding machines are commonly used on construction job sites and other places where the ambient air contains dust, chemicals and abrasive particles that create serious problems of corrosion and erosion when such air is continuously circulated through the machine. On construction job sites, for example, the welding machine is commonly energized continuously during the working day but under normal conditions the actual operation of the welder is rather intermittent, i.e., the welding machine is idling most of the time and even when welding is commonly under light loads. Thus for temperature regulating purposes an abnormal amount of contaminated air is continuously circulated unnecessarily through the machine contributing corrosion and erosion problems that shorten the life of the machine. The low duty cycle together with the low current sometimes required makes it unnecessary for a welding machine to be continuously cooled, and the invention provides automatic air cooling control for welding machines which will function only when the temperature of the welder requires such cooling.

In an air cooled welder, a fan to circulate a cooling air stream may be energized by a primary power supply common to that of the welding machine. In this event, absent other provisions, the fan would circulate the air stream continuously with the continuous energization of the welding machine. One way to reduce the amount of air flow in a welding system would be to energize the machine only during actual welding operations. This would require a rather expensive primary contactor and would result in undue line disturbances particularly when the machine might be started under load. It would further not be practical to use such an automatic system since this would necessitate an external power supply to operate the control mechanisms and would therefore be rather cumbersome and complicated.

Another way to reduce the amount of air flow in such an automatic system would be by the use of an ambient air temperature responsive switch inside the housing for the machine. This is impractical from the welding standpoint since a welding machine, especially one of the rectifier type, has components that reach operating temperatures rather quickly and it is thus conceivable that the thermal lag between the temperature rise within the machine and the need for cooling could cause serious damage to the components such as rectifiers before the fan would actually start.

The present invention provides an automatic cooling system for a welding machine which overcomes all of the drawbacks above outlined while still being practical, inexpensive and easy to install and maintain. This is achieved by thermally coupling a heat sensitive switch such as a thermostat to a series positioned resistance element in the machine's welding circuit. This element will generate heat as a function of the amount of current therethrough and since it is in series with the welding circuit the heat generated by the resistor is a function of the amount of welding current. When heavy welding current is drawn, the resistor heats the thermal switch which in turn starts the fan to initiate cooling. While the thermostat is thermally coupled to the resistace element, it will also be influenced by the ambient air temperature within the welder housing. Thus with high ambient internal air temperature it would require less current through the elment to close the thermostat than would be required under very low ambient temperatures.

Other objects and advantages of the invention will be pointed out in the following description and claims and illustrated in the accompanying drawing, which discloses, by way of example, the principles of the invention and the best mode which has been contemplated of applying these principles.

The single figure is a simplified circuit diagram of a welding machine control circuit for providing the necessary welding current plus means to cool said circuit constructed in accordance with this invention.

Referring to the figure, a step-down transformer 10 of the type used with arc welders supplies alternating current to the rectifier bridge 11. Bridge 11 is composed of a plurality of rectifiers of the dry plate type and rectifies the alternating current present in the secondary of the transformer 10 to provide a D.C. welding current to establish an arc 12 between an electrode 13 and a workpiece 14, as is known in the art. The transformer 10 and rectifiers 11 are within a housing 20 of the machine. Undue heat may be dissipated by circulating air from a fan 18.

A resistor 15 is connected in series with the welding circuit of the transformer 10. The heat generated by the resistor 15 is proportionate to the amount of current therethrough and consequently is proportionate to the amount of welding current. A thermostatic or heat responsive switch 16 is thermally coupled to the resistor 15. That is, the resistor 15 may be adjacent the thermostatic switch 16 so that the thermostatic switch 16 immediately receives the heat produced by current in the resistor 15. Thermostatic switch 16 may be in the main power supply line to a motor 17 which operates the fan 18. When switch 16 is closed in response to a rise in temperature, motor 17 is energized and thereby drives the fan to start the cooling.

The resistor 15 and thermostatic switch 16 are selected so that when the welder is used at approximately one half of its rated output, the thermostatic switch 16 will close due to the temperature rise in the resistor 15 and the fan 18 will operate to cool the unit. There will be no appreciable thermal lag as the resistor 15 is thermally coupled to the thermostatic switch 16. However, should the temperature of the welder rise due to external reasons, such as the heat of the sun at low currents, the thermostat 16 will also control the fan 18 for circulating cooling air.

Under idling conditions, the transformer exciting current and rectifier leakage current provide enough heat to keep the welder warm and offer a deterrent to moisture condensation within the welder housing if the welder is left on the line.

It should be noted that the simplified circuitry shown is only illustrative. The usual embellishments such as a manual control switch, current regulation, etc., are omitted for the sake of clarity and simplicity since they form no part of this invention. Additionally, a rectifier bridge-type welder is only illustrative. The invention finds utility with other types.

While there have been shown and described and pointed out the fundamental novel features of the invention as applied to the preferred embodiment, it will be understood that various omissions and substitutions and changes in the form and details of the device illustrated and in its operation may be made by those skilled in the art with-

I claim:

1. In an arc welding circuit for supplying welding current to an arc established between a welding electrode and a workpiece, a resistive element connected in said circuit to carry at least a portion of said current, said resistor generating heat as a function of said portion, a motor connected to drive a fan to generate an air stream directed across said circuit for cooling the same, thermal switch means controlling the application of power to said motor, said switch being thermally coupled to said resistive element.

2. In an arc welding circuit as defined by claim 1 wherein said circuit includes a rectifier bridge, said resistor being connected in series with said bridge.

3. An arrangement for automatically cooling an arc welding machine comprising; means for supplying an arc welding current to a welding circuit of the welding machine, an electrical resistance connected in series in the welding circuit to thereby carry current proportional to that in the welding circuit and to generate heat accordingly, a thermally responsive actuating means thermally coupled to the electrical resistance, a fan for circulating air over the welding circuit for cooling the same, the fan being operable in response to the thermally responsive actuating means so that upon the welding circuit drawing heavy current the fan will operate without appreciable thermal lag and will also operate upon a rise in temperature of the thermally responsive actuating means caused by any other source.

4. An arc welding machine of the type including an arc welding circuit for supplying a welding current to an arc established between a welding electrode and a workpiece, air circulating means for circulating air over the welding circuit for temperature control purpose, and improved means for automatically controlling the air circulating means, the automatic control means comprising; an electric circuit element connected in the welding circuit and adapted to evolve heat proportional to the current in the welding circuit, a heat responsive control means thermally coupled to the circuit element to receive the heat evolved therefrom without appreciable thermal lag, and means operating the air circulating means in response to the condition of the heat responsive control means.

5. An arc welding transformer machine including a stepdown welding and a rectifier bridge for supplying welding current through a welding circuit to an arc established between an electrode and a workpiece, an automatically controlled fan for circulating air over the welding circuit, a resistance connected in series in the welding circuit to receive current proportional to the welding current and thereby evolve heat also proportional to the welding current, a heat responsive switch thermally connected to the resistance to receive the effects of the heat evolved therefrom, means for driving the fan, the fan drive means being controlled in response to the condition of the heat responsive switch.

6. An arc welding machine as defined in claim 5 wherein the resistance and heat responsive switch are matched such that the fan will operate when the welding machine is used at approximately one half its rated output.

References Cited in the file of this patent

UNITED STATES PATENTS

| | | |
|---|---|---|
| 1,528,425 | Holslag | Mar. 3, 1925 |
| 1,959,513 | Weyandt | May 22, 1934 |
| 2,125,110 | Harty | July 26, 1938 |
| 2,171,643 | Brenkert | Sept. 5, 1939 |
| 2,425,657 | Tunick | Aug. 12, 1947 |
| 2,777,973 | Steele et al. | Jan. 15, 1957 |
| 2,825,004 | Rebuffoni et al. | Feb. 25, 1958 |
| 3,059,164 | Johnson | Oct. 16, 1962 |